Oct. 31, 1933.　　T. F. BLUDWORTH ET AL　　1,932,766
REMOTELY CONTROLLED RADIO AND PHONOGRAPH SYSTEM
Original Filed April 15, 1930　　8 Sheets-Sheet 3
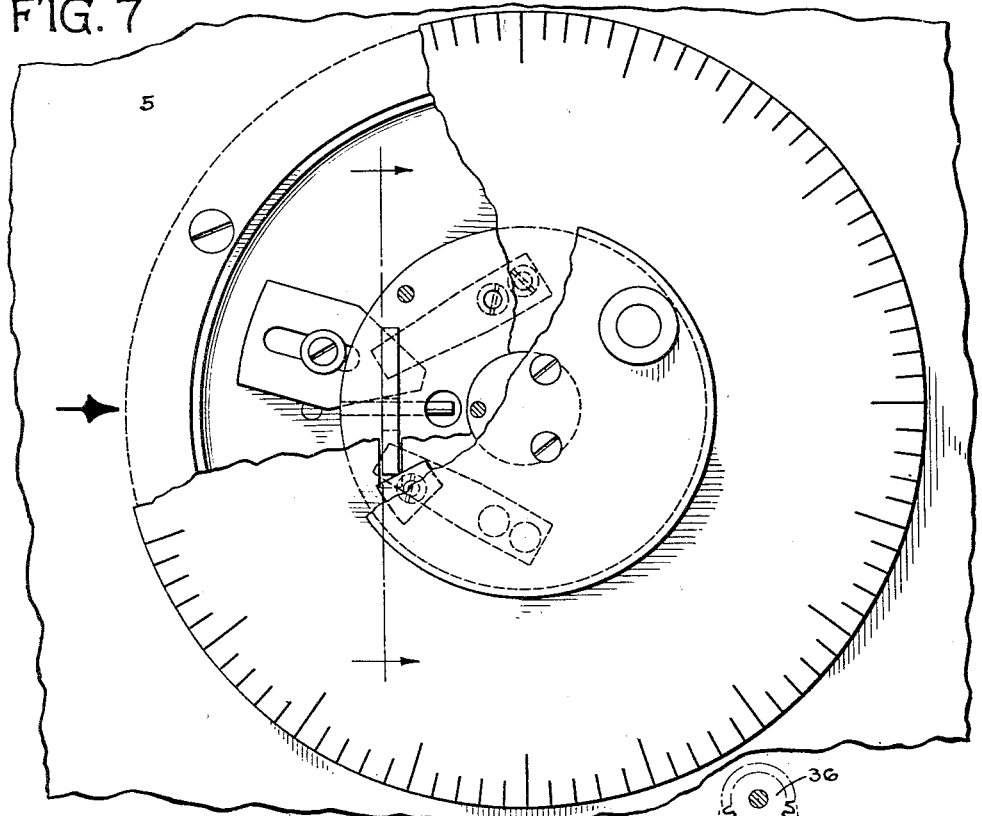
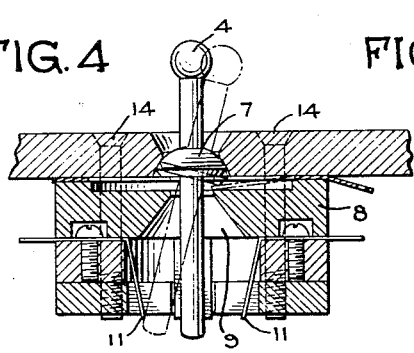
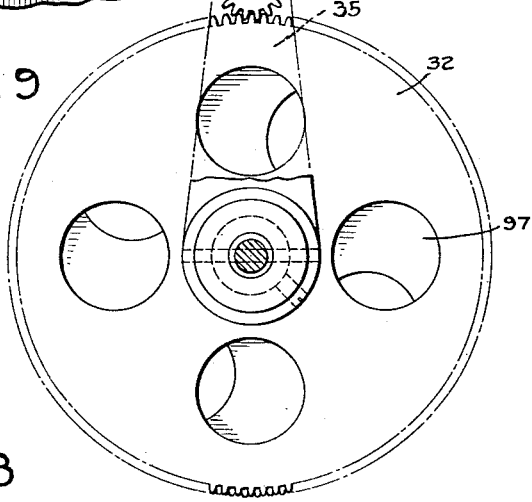
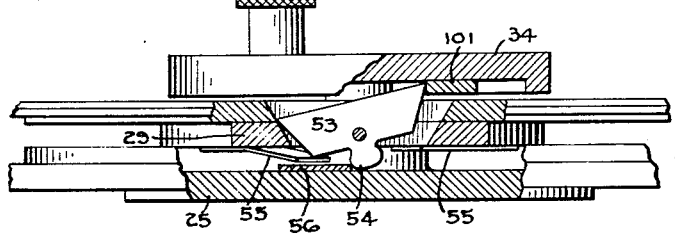
INVENTOR
TIMOTHY F. BLUDWORTH
WILLARD C. BLAISDELL
BY JOHN B. VACHRIS
D. Clyde Jones
ATTORNEY Oct. 31, 1933.   T. F. BLUDWORTH ET AL   1,932,766
REMOTELY CONTROLLED RADIO AND PHONOGRAPH SYSTEM
Original Filed April 15, 1930    8 Sheets-Sheet 4
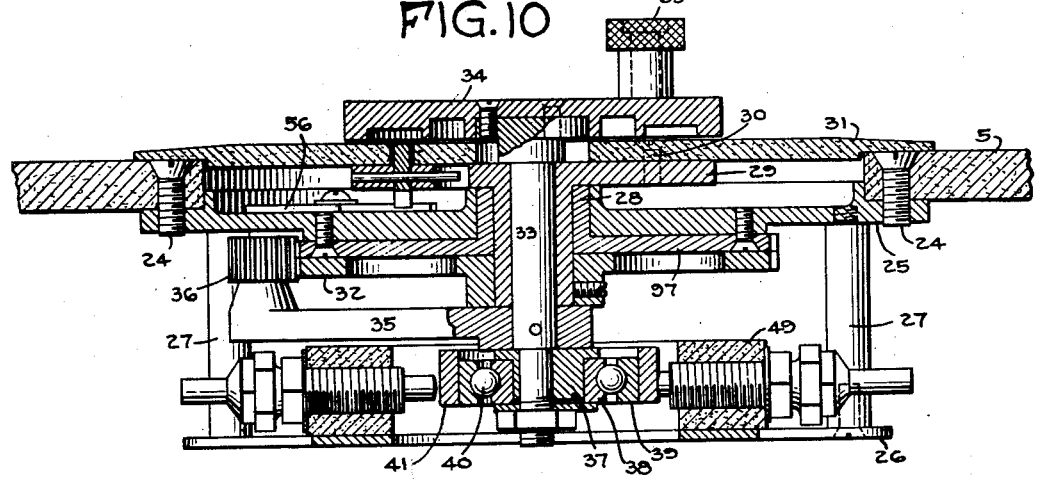
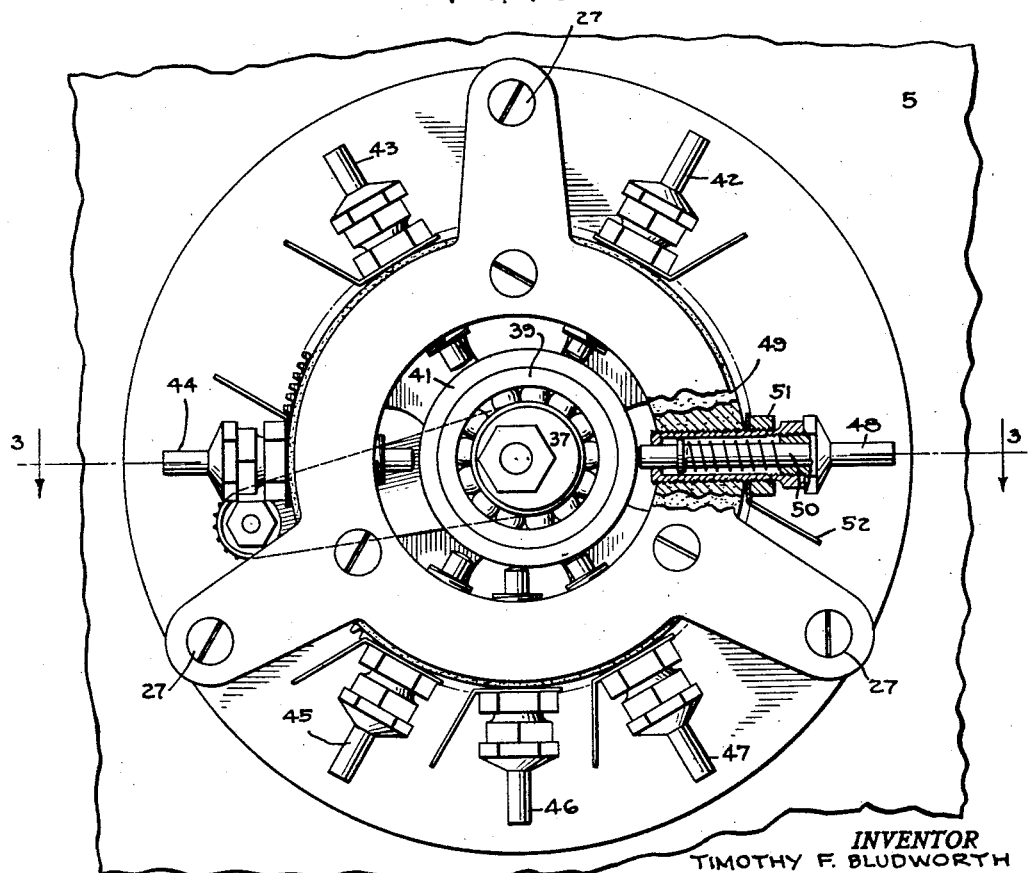
INVENTOR
TIMOTHY F. BLUDWORTH
WILLARD C. BLAISDELL
BY JOHN B. VACHRIS
D. Clyde Jones
ATTORNEY Oct. 31, 1933.   T. F. BLUDWORTH ET AL   1,932,766
REMOTELY CONTROLLED RADIO AND PHONOGRAPH SYSTEM
Original Filed April 15, 1930   8 Sheets-Sheet 6

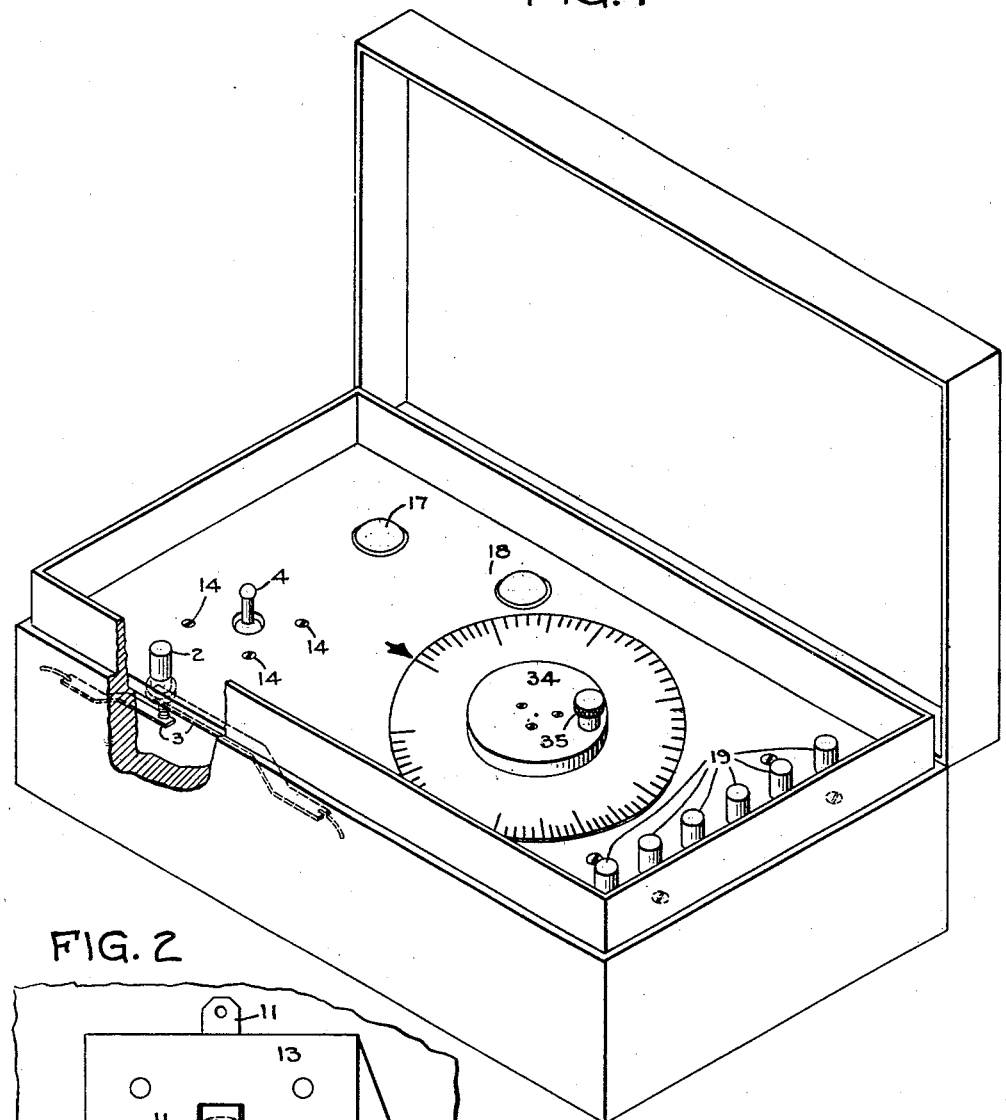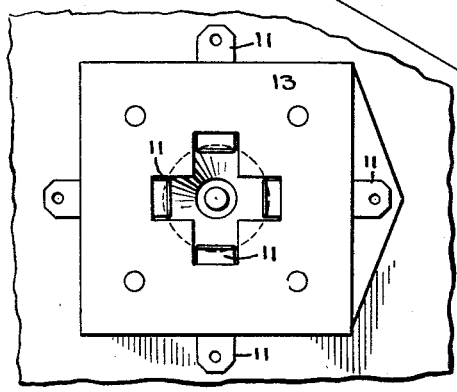

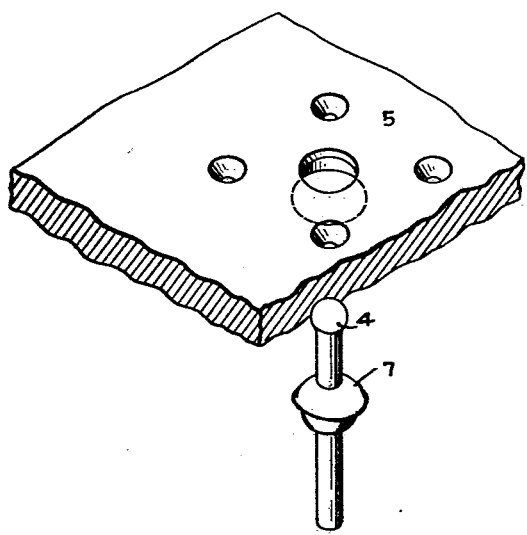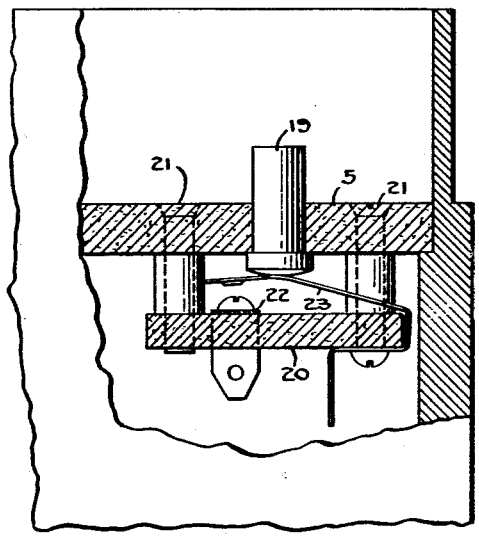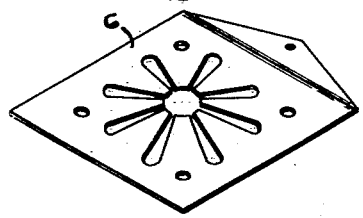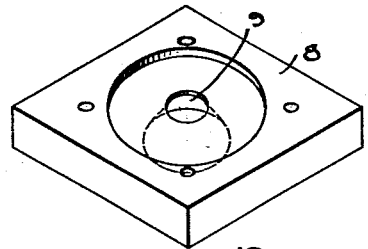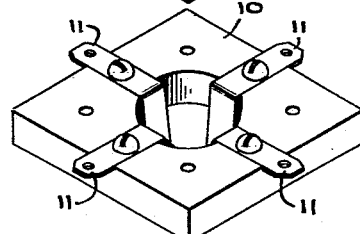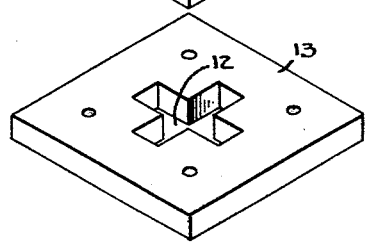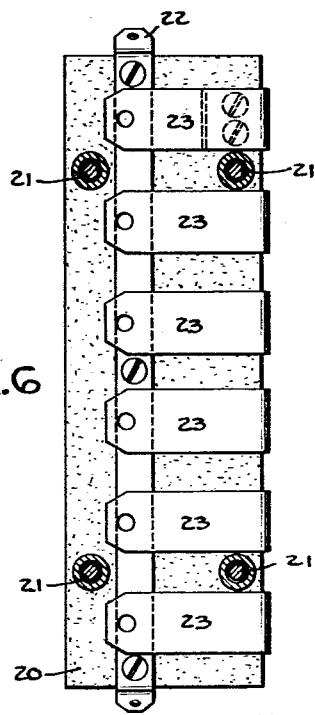

INVENTOR
TIMOTHY F. BLUDWORTH
WILLARD C. BLAISDELL
BY JOHN B. VACHRIS
D. Clyde Jones
ATTORNEY

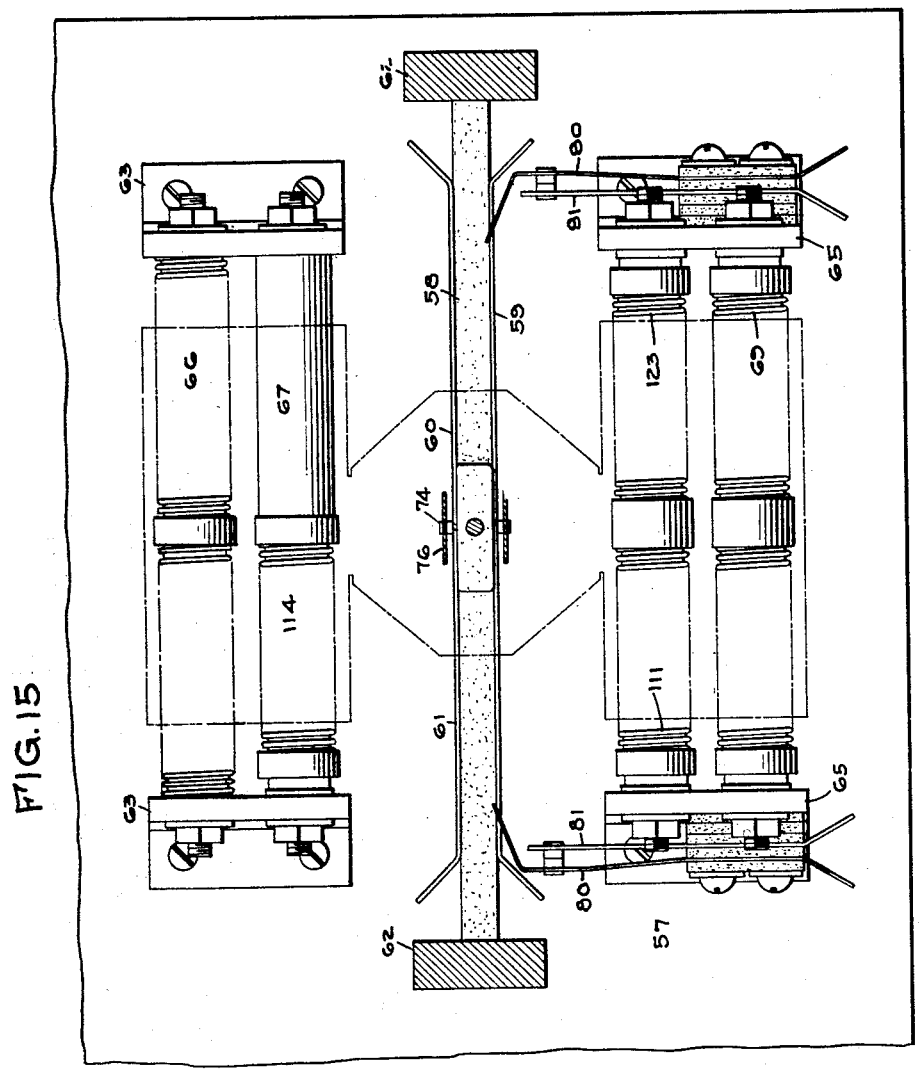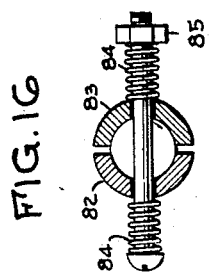

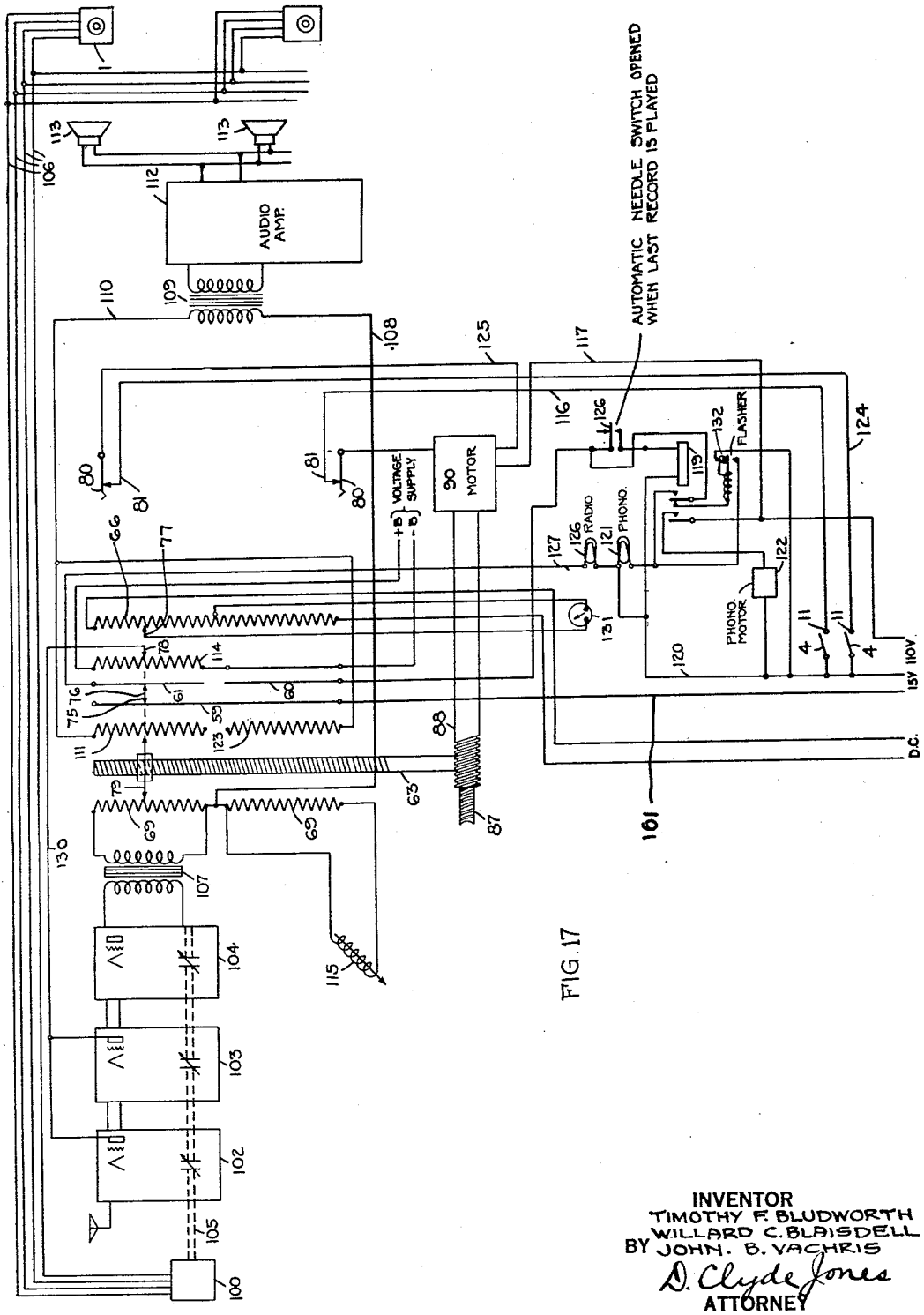

Patented Oct. 31, 1933

1,932,766

UNITED STATES PATENT OFFICE 1,932,766

REMOTELY CONTROLLED RADIO AND PHONOGRAPH SYSTEM

Timothy F. Bludworth, Willard C. Blaisdell, and John B. Vachris, New York, N. Y., assignors to Bludworth, Inc., New York, N. Y., a corporation of New York Application April 15, 1930. Serial No. 444,488
Renewed December 21, 1931

14 Claims. (Cl. 179—100.11)

This invention relates to remote control systems and more particularly to systems for the optional remote control of a combined radio receiving and a phonograph reproducing system.

Such a system has previously been proposed in the copending application of T. F. Bludworth S. N. 328,808 filed Dec. 27, 1928, but the present invention is directed to an improvement in operation and a simplification of the equipment involved therein.

Figure 12:
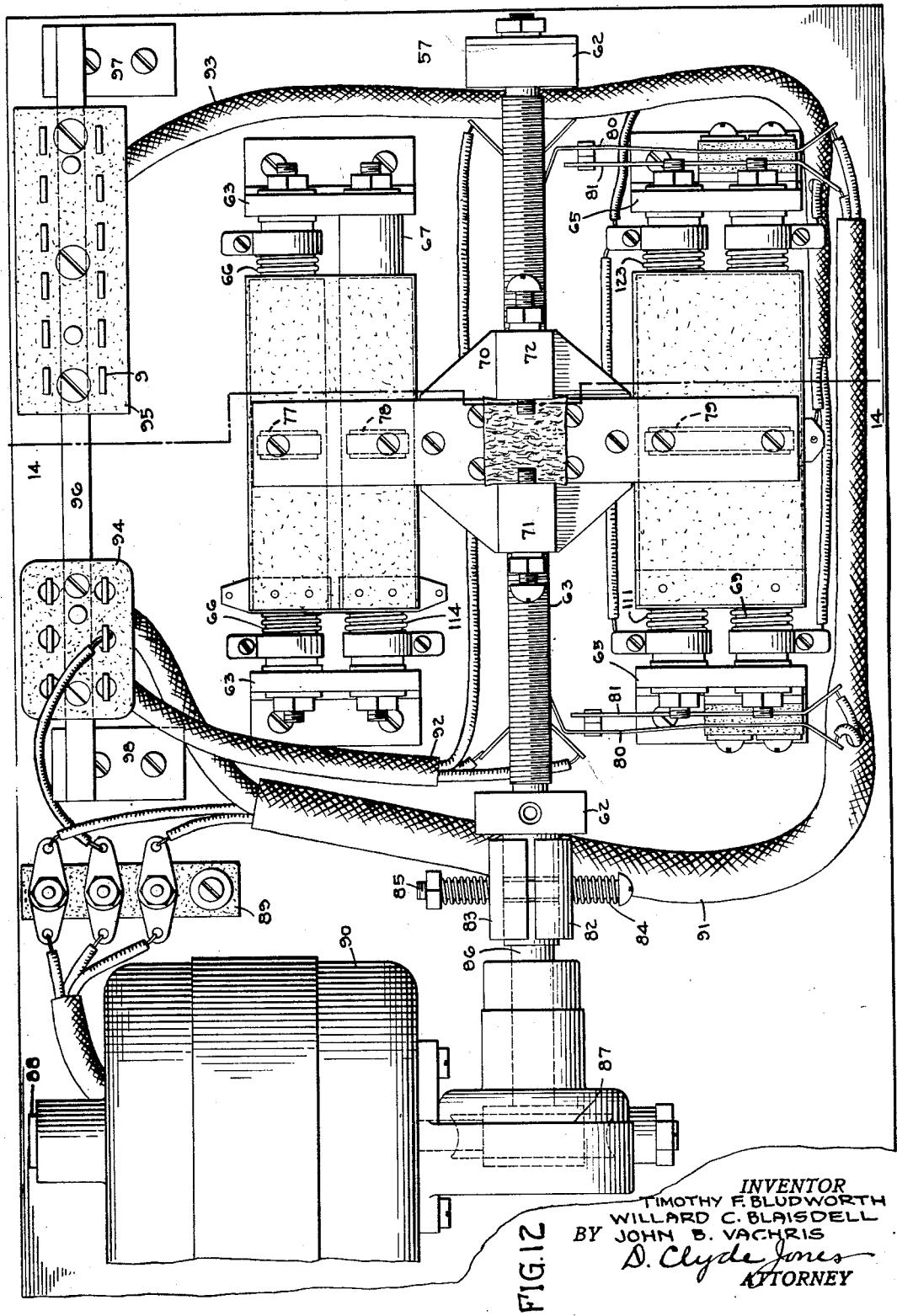
Figure 14:
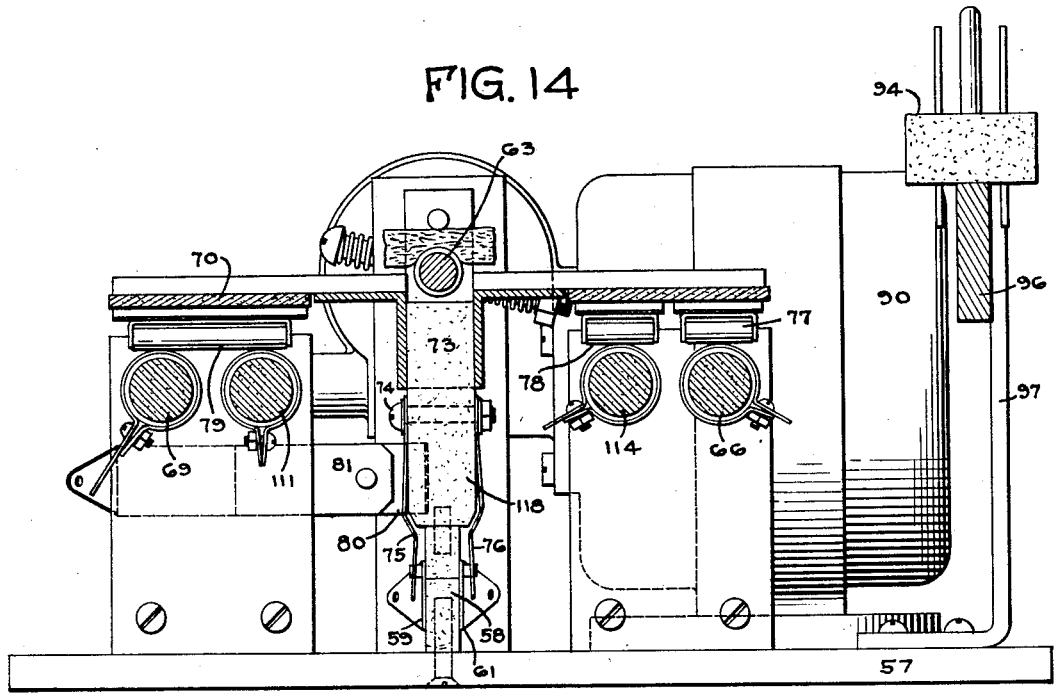
Figure 13:
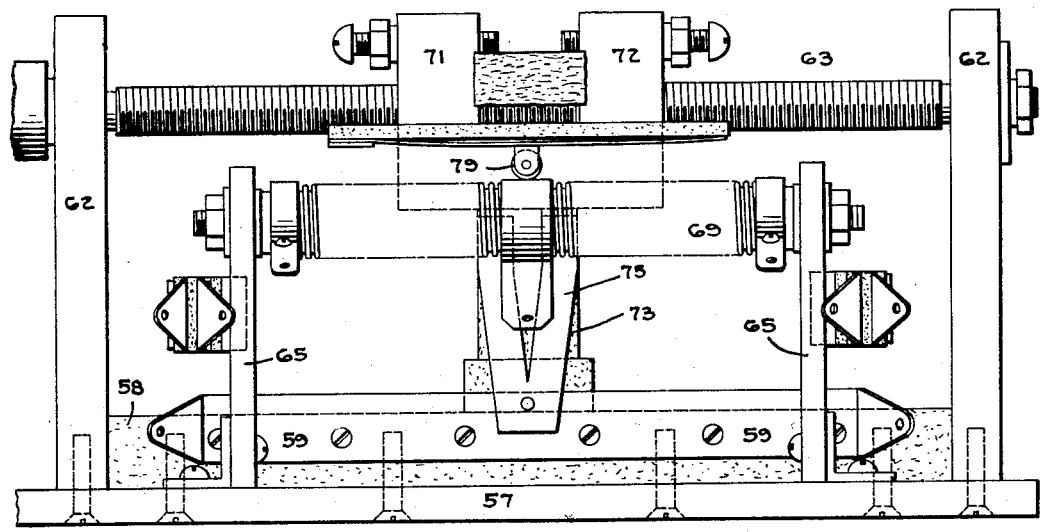

Referring to the drawings Fig. 1 discloses a portable control unit, of which there may be any desired number, located at a remote point for selectively operating combined radio and phonograph reproducing equipment; Fig. 2 is a bottom view of a multiposition switch for use in the control unit of Fig. 1; while Fig. 3 is an exploded view of this multi-position switch; Fig. 4 is a vertical sectional view through the multi-position switch with the movable member in dotted position to show its method of operation; Fig. 5 is a vertical cross sectional view taken through a portion of the control unit of Fig. 1 showing a side elevation of one of the push button switches utilized for completing circuits to render desired loud speakers of the system operative; Fig. 6 is a top view of a portion of these push button switches showing the electrical contacts thereof with the push buttons omitted; Fig. 7 is a top view of the sender of the control unit of Fig. 1 with parts broken away; Fig. 8 is a view partially in section showing in detail the stop mechanism of the sender equipment to limit its rotation to two directions of rotary movement; Fig. 9 is a detail view of a portion of the movable element of the sender which element is herein referred to as the epicyclic unit; Fig. 10 is a vertical section taken through the center of the sender unit; Fig. 11 is a bottom view of the sender unit; Fig. 12 is a plan view of the control mechanism associated with the radio receiver and phonograph unit which comprises switching means for rendering the sending unit of Fig. 1 effective to control either the radio receiver or the phonograph device, at the will of the operator; this mechanism also includes means for varying the volume of the radio receiver or the phonograph unit so that the volume of sound reproduced by either of these devices is at a desired level; Fig. 13 is a side elevation of a portion of the equipment shown in Fig. 12 while Fig. 14 is a vertical cross sectional view taken on the line 14—14 of Fig. 12; Fig. 15 is a plan view of the attenuators and the limit control switches also shown in Figs. 13 and 14; Fig. 16 is a frictional clutch for connecting the driving motor with the movable element of the switching unit; and Fig. 17 is a circuit diagram by which the control unit of Fig. 1 may be utilized to actuate the switching device, and the volume control mechanism shown in Fig. 12, and the radio tuning mechanism indicated at the upper left hand corner of this circuit diagram.

Remote control unit

Referring especially to Fig. 1 there is represented a portable cabinet or box 1 of a remote control unit provided with a switch button 2 to actuate simple make contact springs 3, the purpose of which will be described in the operation of the system. 4 indicates the operating element of a multiposition switch shown in the detailed views 2, 3 and 4. As indicated in Fig. 3, this switch includes the movable element 4 projecting through the top panel of the remote control unit. This multiposition switch, as shown, may actuate four different contacts in its four positions of operation, although it will be understood that the number of these positions may be increased or diminished as desired. This movable element 4 is supported on a metal plate 6 formed with resilient fingers to frictionally engage an enlarged portion 7 of the movable element, which plate is supported between the panel 5 and a block of insulation 8 having a central cut out portion 9 to permit the lower part of the movable member 4 to swing on the resilient plate as a pivot. The switch also includes a second block of insulation 10 provided with four metal contactors 11 spaced 90 degrees apart and projecting through the cross-shaped opening 12 of a third block of insulation 13. The resilient plate and the blocks of insulations 8, 10 and 13 are assembled in the order shown in Fig. 3 on the under side of the panel 5 by means of screws 14.

The panel 5 is also provided with a light which may include an electric light bulb (not shown) and a colored agate 17 used in the present system to indicate that the phonograph is operative. A second light to indicate that the radio portion of the system is operative, may include an electric light bulb (not shown) and a canopy cover 18 for projecting the light onto the top surface of the dial of the sending equipment to be described.

At the extreme right of the control unit of Fig. 1 there is indicated a series of push buttons 19 for selectively rendering one or more of the loud speakers of the system operative while one of these push buttons may be utilized to control a circuit for disabling all of the loud speakers that are in operation so that a different combination of loud speakers may be made effective by depressing corresponding push buttons 19 of the group. These push button switches as shown in Figs. 5 and 6 include a strip of insulation 20 mounted in spaced relation from the lower side of the panel 5 by means of screws and sleeves 21. The strip 20 has secured thereon a long piece 22 of conducting material extending longitudinally thereof. In addition there are provided a plurality of resilient contact springs 23 mounted along one edge of the strip 20 and having their free ends superimposed above the piece 22. The push buttons 19 are mounted in apertures in the panel 5 and each of them is arranged to move its associated control spring 23 into engagement with the conducting piece 22.

The remote control unit 1 also includes a sender for directively adjusting a motor 100 (Fig. 17) which effects the tuning of the radio receiver portion of the system into resonance with any desired broadcasting station. This sender is mounted in a circular opening in the panel 5 and includes a frame formed of a circular upper member 25 secured to the panel by screws 24 and a lower ring 26 fastened in spaced relation to the upper member by screws and posts 27. On the under side of the upper plate 25 there is fastened a disc 97 provided at its outer periphery with teeth and at its center with a bearing portion 28. This bearing portion rotatably supports a collar formed integral with the rotatable plate 29 to which there is fastened by screws such as 30 a dial 31 engraved with graduations corresponding to kilocycles, wave lengths or other station designations. On the lower part of this collar there is secured a gear wheel 32 having a greater number of gear teeth than on the periphery of the member 97. The collar also serves as a journal in which the axle 33 rotates, on the upper part of which there is secured a central plate 34 provided with a handle 35 by which the plate and axle may be rotated. Intermediate of the ends of the axle 33 and positioned to engage the lower end of the collar, there is secured an arm 35 on an extension of which the gear 36 is rotatably mounted, to mesh with the teeth on the periphery of members 97 and 32. On the lower end of the axle 33 and supported between a shoulder thereof and a nut engaging its end, there is an eccentric cam 37 provided with a shoulder cooperating with a washer under the nut of the axle to firmly engage the part 38 of a ball bearing race. The other part of the race includes a circular member 39 which with the member 38 provides a track or raceway in which the balls 40 rotate. There is frictionally mounted on the race member 39 a contact ring 41 with which the contact pins 42, 43, 44, 45, 46, 47 and 48 may make engagement in sequence as will further be described. As shown in Figs. 10 and 11 these pins are mounted in a circular ring 49 of insulating material having radially spaced openings therein. In each opening there is threaded a sleeve member in which a contact pin 50 has limited movement radially through the ring. A coil spring having one end engaging a shoulder of the pin and its other end engaging a threaded plug in one end of the sleeve, tends to hold the pin in its innermost adjustable position toward the axle. The outer portion of the sleeve is threaded for engagement by a nut 51 which holds a contact terminal 52 in close engagement with the insulating ring.

In order to limit the plate 34 of the sender to a definite arc of rotation its under surface is provided with a shoulder 101 to cooperate with a rocking member 53 and having an extension 54. This rocking member is normally held in horizontal position by resilient springs 55. An adjustable stop 56 mounted on the frame member 25, in one extreme position of the plate 34 causes the extension 54 to move the rocking member to the position shown in Fig. 8 whereby one of its ends engages the stop 101 and its other end engages a portion of the member 29, while in the other extreme position of plate 34, the rocking member is moved to a position which is the reverse of that shown in Fig. 8.

*Switching mechanism*

The mechanism for switching control from the radio receiving device to the phonograph device or vice versa and for controlling the volume level of reproduced sound is shown in Figs. 12 to 16 inclusive. This mechanism includes a base plate 57 on which there is mounted a bar of insulation material 58 (Fig. 15) having on one side a continuous contact strip 59 and on its other side divided contact strips 60 and 61. At the end of the bar 58, there are provided spaced up-rights 62 in the upper part of which there is journaled the threaded shaft 63. On either side and at a distance from the bar 58 there are provided two pairs of up-rights 65. At the top of the spaced up-rights 65 there are mounted in spaced relation by means of bolts, rheostats 66, 67 and 114 and there are similarly mounted in spaced relation at the top of the up-rights 65, the rheostat 69 and the rheostat comprising the units 111 and 123. These rheostats preferably are formed of a core of insulation material on the outer surface of which there is spirally wound a coil formed of resistance wire.

On the threaded shaft 63 there is supported a carriage generally designated 70, including a U-shaped member having uprights 71 and 72 threaded to engage the shaft 63 so that as the shaft rotates the carriage 70 moves in one direction or the other longitudinally thereof. On the under side of the carriage there is supported a strip 73 of insulating material on the sides of which there are mounted by means of a bolt 74 springs 75 and 76 which respectively engage the contact strip 59 and the divided contact strips 60 and 61. Electrical connection between the springs 75 and 76 is effected through the bolt 74. On one side of the carriage 70 there are mounted a pair of rollers 77 and 78 engaging rheostats 66 and 114 and a large roller 79 bridging the coils on the rheostat 69 and either of the units 111 and 123 depending on its position. On the uprights 65 there are mounted in a block of insulation the switch springs 80 and 81 so that as the piece of insulation 73 is moved to either of its extreme positions it breaks engagement between the springs 80 and 81. The threaded shaft 63 is coupled by a frictional clutch (Fig. 16) comprising the pieces 82 and 83 of a split ring normally held together by springs 84 and encircling a bolt 85 passing through the rings. This coupling frictionally engages the threaded shaft 63 and the stub shaft 86 in turn driven through a worm reduction gear 87 from the shaft 88 of a reversible motor 90 preferably of the split-field alternating current type having the same torque in both directions of revolution. The field windings of this motor terminate in contacts of a terminal strip 89. While the other conductors preferably in the form of cables 91, 92 and 93 terminate in two contact terminal strips 94 and 95 preferably of the plug and jack type which terminals are mounted in insulation secured to a horizontal bar 96 mounted on the spaced uprights 97 and 98.

Operation of the sender

When it is desired to operate the sender, the handle 35 is rotated causing the plate 34 and the axle 33 connected thereto, to rotate. The rotation of this axle turns the arm 35 connected thereto to rotate and the pinion carried thereby is also caused to turn since its teeth engage the teeth on the periphery of the fixed disc 97. It has been mentioned that the number of teeth on this disc is slightly different from the number of teeth on the toothed wheel 32, preferably in some relation such as 130 to 131. Therefore, if the pinion 36 rotates during a complete cycle of operation, it causes the toothed wheel 32 to be advanced the distance of one tooth. This wheel as will be remembered is connected to the plate 29 on which the dial 31 is fastened. The arrangement of the parts just described is such that the dial is advanced slowly in response to a large number of turns of the handle 35 thereby permitting a vernier adjustment. As the axle 33 rotates, it carries with it the eccentric cam 37 and since there is slight friction in the ball bearings, the race member 39 and the contact ring 41 are advanced slightly in a direction opposite to that in which the axle is turning. This slight movement of the contact ring 41 effects a wiping contact with the contact pins such as 42, 43, etc. and also insures that each pin contacts with a different portion of the contact ring in each cycle of revolution. It should be noted at this point that the contact pin 46 is adjusted to engage the contact ring 41 at all times and the remaining contact pins are so adjusted that not more than two of them are in engagement with the surface of the contact ring at any one time.

Operation of the switching mechanism

The apparatus previously described may be used with any well-known type of radio receiver but as shown in the diagram of Fig. 17 it is used in connection with a radio receiver of the tuned radio frequency type having two radio frequency amplifying stages 102, 103 and a detector 104 each including vacuum tubes. In accordance with the common practice, the radio frequency stages and the detector are tuned by a multi-unit variable condenser actuated from a common shaft 105 which may be driven by a step motor 100 of the character disclosed in the copending application of Arthur P. Davis S. N. 204,919, July 11, 1927. This motor is adjusted over the four conductors 106 which are variably controlled by the sender represented in Figs. 7 to 11 inclusive.

The output of the detector 104 includes the primary winding of a transformer 107, across the terminals of the secondary winding of which there is connected a portion of resistance element 69. One terminal of this secondary winding is also connected by conductor 108 to the primary winding of an audio frequency transformer 109, the other end of this primary winding being connected over the conductor 110 to a terminal of the resistance unit 111 and a terminal of resistance unit 123. The roller 79 on the carriage 70 is adjusted by the motor 90 under the control of the operator at the distant station as will be pointed out. With the roller 79 in its uppermost position of the diagram Fig. 17 the resistance unit 69 and 111 will be short-circuited so that the maximum signal energy is transmitted to the audio transformer 109. This audio transformer has its secondary winding connected in the input of an audio frequency amplifier 112 which may include one or more amplifying stages of the vacuum tube type. The output of this amplifier is connected to loud speakers 113 located at each of the positions where it is desired to reproduce programs. The anodes of the radio frequency amplifier tubes in stages 102 and 103 are connected over conductor 130 to the roller 78 engaging turns of the resistance unit 114, so that these anodes are connected potentiometer fashion to the B voltage supply.

If the listener desires to hear a program of phonograph records, the audio amplifier 112 is switched from the radio receiver and connected to a magazine phonograph, the pickup 115 and the turntable motor 122 of which only are shown. This switching operation is brought about by moving the element 4 of the multi-position switch to engage the contact 11 which is associated with the phonograph control conductor 116. This closes a circuit from one side of the 110 volt alternating current source to the contact 11, conductor 116, contacts 81 and 80 of the limit switch, one winding of the motor 90, conductor 117 to the other side of the alternating current source. Under the control of this circuit the motor 90 through the shaft 88 and the reduction gearing 87, rotates the threaded shaft 63 to move the carriage 70 downward as shown in this diagram. This moves the roller 79 into engagement with the resistance unit 69 and 111, gradually reducing the signal energy from the radio receiver to zero until the brush 76 comes into engagement with the conducting strip 60 bridging it into conductive connection with the strip 59. When this takes place, the relay 119 is energized from the low voltage source, over conductor 120, winding of the relay 119, phonograph needle switch 126, strips 60 and 59 now in conductive relation, and conductor 161 to the other side of the mentioned current source. With the relay 119 energized, the lamp 121 (under agate 17) is lighted in multiple therewith to indicate that the phonograph is in operative condition. Also at this time the turntable motor 122 of the phonograph is operated from one side of the alternating current source over conductor 120, winding of the motor, front contact and armature of the relay 119 to the other side of the 110-volt alternating current source. With the roller 79 now in engagement with the resistance unit 69 and 123 the pickup 115 of the phonograph is connected over conductors 108 and 110 to the primary winding of the transformer 109 so that current developed by the pick-up 115 in the playing of the record is amplified by the audio amplifier 112 and reproduced in audible form by the loud speakers 113. It will be understood that as the roller 79 passes from engagement with the resistance unit 111 the radio volume is reduced to zero and as this roller proceeds into engagement with the resistance unit 123 the volume of the phonograph program is gradually increased until the roller is in its lowermost position at which time the lowermost limit switches 80 and 81 are opened to stop the operation of the switching motor 90. It should be pointed out that roller 79 makes contact with unit 123 before it breaks contact with unit 111 in order to prevent undesirable noises from being developed in the loud speaker.

An automatic magazine phonograph (not shown) is provided with a needle switch 126 which is opened, when the last phonograph record of the series is played, to deenergize relay 119 and stop the phonograph motor 122. This is effective because the reproducer and its needle or stylus drops into engagement with the turntable (not shown) when there is no record on the turntable. If at this time the operator fails to disconnect current from the amplifier system, the phonograph lamp 121 is caused to give a flashing signal. This is effective in the following manner. On the opening of the needle switch 126 a circuit is closed from one side of the 15 volt source, over conductor 120, normally closed contact 132 of the thermostat switch, inner back contact and armature of relay 119, conducting strip 60, contact springs 76 and 75, conductor strip 59 to the other side of the 15 volt source. The thermostat switch 132 becomes heated and closes its normally opened contact whereby a circuit is closed over conductor 120 for lighting the phonograph lamp 121, including the normally opened contacts of switch 132, back contact and armature of relay 119 and thence to the other side of the 15 volt source to the circuit previously described. The phonograph lamp remains lighted in the circuit until the thermostat cools thereby closing its normally closed contacts and interrupting the lighting circuit on lamp 121. However, this closes a circuit through the heat coil of the thermostat wherein it is heated and closes its normally open contact again to light the phonograph lamp 121. In this way the lamp is intermittently lighted until current is disconnected from the system or until a new supply of records is put into the magazine.

If the listener now decides that he wishes to hear a radio program, the movable element 4 of the multi-position switch is moved into contact with another spring 11 which is connected with the conductor 124. This completes a circuit from one side of the alternating current source over conductor 124, the uppermost limit springs 81 and 80, conductor 125, winding of the motor 90, conductor 117, to the other side of the alternating current source. Under the control of this circuit, the motor 90 moves the carriage upward and as the roller 79 is moved upward therewith the volume of the phonograph program is reduced to silence and then when this roller makes contact with the resistance units 69 and 111 the volume of the radio program is gradually increased until the desired volume level is reached. When the springs 75 and 76 make contact between the strips 59 and 61, the radio lamp 126 is lighted from one side of the low voltage current source, conductor 120, lamp 126, conductor 127, strip 61, springs 75 and 76, strip 59, conductor 161 to the other side of the current source. The lighting of the lamp 126 provides a light through the canopy of Fig. 1 to light the dial of the sender which can then be operated to cause the motor 100 to effect any desired tuning adjustment of the condenser shaft 105, to receive any desired program. If during the switching from the phonograph operation to the radio operation the motor 90 is caused to operate the carriage 70 until the upper limit springs 80 and 81 are opened, then of course the operation of the motor 90 is stopped until another circuit is completed through the conductor 124 and the reverse winding of the motor to cause the carriage to retrace its movement.

What I claim is:

1. In a system for the reproduction of radio programs and phonograph records, a radio receiving device and an electrical phonograph device located at a central point, said radio receiving device having a tuning unit including an element progressively movable to a relatively large number of different positions of adjustment, an amplifier common to said radio and phonograph devices also located at said central point, sound reproducing means electrically connected to said amplifier, means directly actuated at will from a remote point for electrically connecting one of said devices to said amplifier to the exclusion of the other, and means controlled from a remote point for selectively adjusting said element whereby the tuning of said radio receiving device may be changed at will.

2. In a system for the reproduction of radio programs and phonograph records, a radio receiving device and an electric phonograph device located at a central point, an amplifier common to said radio and phonograph devices also located at said central point, sound reproducing means electrically connected to said amplifier, combined switching and volume control means for said devices directively controlled from a remote point for electrically connecting one of said devices to said amplifier to the exclusion of the other at will, and electrical means for adjusting the tuning of said receiving device from said remote point to receive a desired program.

3. In a system for the reproduction of radio programs and phonograph records, a radio receiving device, an electric phonograph device, an amplifier common to said radio and phonograph devices, sound reproducing means electrically connected to said amplifier, attenuator means for regulating the amount of energy introduced by said devices into said amplifier, switching means for rendering operative one of said devices to the exclusion of the other, mechanism directively controlled from a remote point for actuating each of said means, and means for adjusting the tuning of said radio receiving device.

4. In a system for the reproduction of radio programs and phonograph records, a radio receiving device, an electric phonograph device, an amplifier common to said radio and phonograph devices, switching means for electrically connecting one of said devices to said amplifier to the exclusion of the other, and a reciprocating carriage adjustable to any one of a relatively large number of different positions of adjustment directively controlled from a remote point for operating said switching means.

5. In a system for the reproduction of radio programs and phonograph records, a radio receiving device, an electric phonograph device, an amplifier common to said radio and phonograph devices, switching means for electrically connecting one of said devices to said amplifier to the exclusion of the other, a carriage for actuating said switching means, said carriage being movable back and forth in a rectilinear path of predetermined length to any one of a plurality of different positions of adjustment, and means to stop said carriage at each end of its path of movement.

6. A system for the reproduction of radio programs and phonograph records, a radio receiving device, an electrical phonograph device, an amplifier common to said radio and phonograph devices, a switch for rendering operative one of said devices to the exclusion of the other, an attenuator for controlling the signal energy delivered from said radio receiving device and phonograph device to said amplifier, and a member movable in a rectilinear path serving to actuate said switch and said attenuator.

7. In a system for the reproduction of radio programs and phonograph records, a radio receiving device, an electric phonograph device, an amplifier common to said radio and phonograph devices, sound reproducing means electrically connected to said amplifier, volume regulating means for said devices for electrically connecting one of said devices to said amplifier to the exclusion of the other, switching means for rendering operative one of said devices to the exclusion of the other, and operating mechanism for said volume regulating means and switching means comprising a threaded shaft, means controlled from a remote point for rotating said shaft, a carriage threaded on said shaft, said carriage serving to adjust said volume regulating means and said switching means.

8. In a system for the reproduction of radio programs and phonograph records, a radio receiving device, an electric phonograph device, an amplifier, switching means for rendering said devices operative including two fixed strips of conducting material and a movable brush, volume control mechanism for electrically connecting one of said devices to said amplifier to the exclusion of the other, said volume control device including two resistors and an element cooperating therewith, means for moving said brush and said element comprising a rotatable threaded shaft, means controlled from a distant point for rotating said shaft in either direction, and a threaded carriage movable longitudinally of said shaft during the rotation thereof, said brush and said element being actuated by said carriage.

9. In a system for the reproduction of radio programs and phonograph records, a radio receiving device and an electrical phonograph device located at a central point, an amplifier common to said radio and said phonograph devices also located at said central point, sound reproducing means electrically connected to said amplifier, means at a remote point for remotely controling the volume of sound reproduced by said reproducing means, means directively actuated at will from said remote point for electrically connecting one of said devices to said amplifier to the exclusion of the other, and means for selectively adjusting the tuning of said radio receiving device from said remote control point.

10. In a system for the reproduction of radio programs and phonograph records, a radio receiving device, and an electrical phonograph device located at a central point, an amplifier common to said radio and said phonograph devices also located at said central point, sound reproducing means electrically connected to said amplifier, switching means directively actuated at will from a remote point for electrically connecting one of said devices to said amplifier to the exclusion of the other, volume control mechanism directively operated from said remote point for regulating the sound volume reproduced by said reproducing means, said volume control mechanism cooperating with said switching means to reduce the sound volume during the switching of said amplifier from one of said devices to the other, and means for selectively adjusting the tuning of said radio receiving device from a remote point.

11. In a system for the reproduction of radio programs and phonograph records, a radio receiving device, an electric phonograph device, sound reproducing means connectible to said devices, means remotely controlled for regulating the volume of sound reproduced by said sound reproducing means, means directively actuated at will from a remote point for electrically connecting one of said devices to said sound reproducing means to the exclusion of the other, and means for selectively adjusting the tuning of said radio receiving device from a remote point.

12. In a system for the reproduction of radio programs and phonograph records, a radio receiving device and an electrical phonograph device located at a central point, sound reproducing means directively actuated at will from a remote point for electrically connecting one of said devices to said sound reproducing means to the exclusion of the other, volume control mechanism directively operated from said remote point for regulating the sound volume reproduced by said reproducing means, said volume control mechanism co-operating with said switching means to reduce the sound volume during the switching of said sound reproducing means from one of said devices to the other, and means for selectively adjusting the tuning of said radio receiving device from a remote point.

13. In a system for the reproduction of radio programs and phonograph records, a radio receiving device and an electrical phonograph device located at a central point, an amplifier common to said radio and said phonograph devices also located at said central point, sound reproducing means electrically connected to said amplifier, means at said central point directively actuated from a remote point for controlling the volume of sound reproduced by said reproducing means, means directively actuated at will from said remote point for electrically connecting one of said devices to said amplifier to the exclusion of the other, and means for selectively adjusting the tuning of said radio receiving device from said remote control point.

14. In a system for the reproduction of radio programs and phonograph records, a radio receiving device and an electrical phonograph device located at a central point, said radio receiving device including a tuning unit provided with an element adjustable to a relatively large number of different positions of adjustment, sound reproducing means connectible to either of said devices, means directively actuated at will from a remote point for electrically connecting one of said devices to said sound reproducing means to the exclusion of the other, and means controlled from a remote point for selectively changing the adjustment of said element whereby the tuning of said radio receiving device may be selectively changed at will.

TIMOTHY F. BLUDWORTH.
WILLARD C. BLAISDELL.
JOHN B. VACHRIS.